Feb. 25, 1947.  E. GROSS  2,416,385
VALVE
Filed Aug. 19, 1944

Inventor
Emil Gross
by W. A. Lieber
Attorney

Patented Feb. 25, 1947

2,416,385

UNITED STATES PATENT OFFICE 2,416,385

VALVE

Emil Gross, Wauwatosa, Wis., assignor to Allis-Chalmers Manufacturing Company, Milwaukee, Wis., a corporation of Delaware Application August 19, 1944, Serial No. 550,149

13 Claims. (Cl. 251—12)

The present invention relates generally to improvements in valves, and relates more particularly to improvements in the construction and operation of disk valves of the butterfly type.

It has heretofore been common practice to provide valves, at the outer peripheral portions thereof, with renewable sealing strips or rings which may be radially adjusted to provide a water-tight joint between the valve and the seat when the valve is in closed position. By the provision of such strips, a tight valve seating may be maintained by periodically adjusting the strip to compensate for wear, deformation or the like; and when the sealing strip has outlived its usefulness and is no longer capable of performing the function of preventing water leakage when the valve is closed, the strip may be removed and replaced, after both upstream and downstream pressure have been shut off, without necessitating replacement of other far more expensive parts.

In the past, however, great difficulty has been experienced in attempting to provide an entirely satisfactory means for effecting adjustment of these separate sealing strips, especially where the valve is to be utilized for handling water under relatively high pressure. One type of heretofore proposed prior art device (such as that disclosed in U. S. Patent No. 1,546,594, July 21, 1925, to C. B. McAuley) for effecting adjustment of sealing strips for disk valves of the butterfly type includes unitary adjusting devices by means of which the sealing strip may be radially adjusted either outwardly or inwardly; however, in such prior art device considerable leakage will occur past the various parts and into the valve wicket, due to the mechanical clearances which must necessarily be maintained to render adjustment possible, when an attempt is made to adjust the valve under pressure and without providing means for shutting down the pressure upstream of the valve. While, in some instances, the amount of leakage past the parts may not be so great as to entirely prevent adjustments toward the valve housing from being made when relatively low heads of water are present, such adjustments would often be impossible by reason of the high impact of the leaking fluid into the interior of the valve disk, when the upstream pressure is increased. This is especially true where the adjustment is one in which the sealing strip must be backed off or pulled inwardly away from its seat to relieve binding or sticking of the valve within the housing; such adjustment being one in which fluid under pressure would obviously leak freely past the clearances between the sealing ring and disk through the central bore of the jack screws and into the valve disk.

The present invention contemplates provision of unitary devices extending into the hollow interior of the valve disk and accessible from the downstream side of the valve when the valve is in closed position for effecting radial adjustments of peripheral sealing strips, either into or out of sealing engagement with their seat within the valve casing, and for positively locking such strips in adjusted position; while preventing leakage past the parts into the interior of the disk during all such adjustments and locking operations.

It is an object of the present invention to provide an improved valve structure comprising a valve disk having a peripheral groove and provided with a sealing strip disposed therein and cooperable with the interior of the valve casing, adjustable means adapted to seat against the strip; and means coacting directly with the adjustable means and with the strip for positively seating and locking the strip against the adjustable means.

Another object of the present invention is to provide an improved adjustable seal for valve disks which obviates all of the disadvantages heretofore encountered.

Another object of the invention is to provide improved adjusting mechanism for peripheral sealing strips especially adapted for butterfly valves by means of which such strips may readily be radially adjusted toward or away from the valve housing while under high pressures.

Another object of the invention is to provide improved unitary devices for effecting universal adjustment of disk valve sealing strips from the downstream side of the valve and without removal of parts while the valve disk is in closed postion and under pressure.

Another object of this invention is to provide improved means for adjusting disk valve sealing strips wherein all parts extend into the interior of the valve disk and are readily accessible for effecting adjustments without removal thereof.

Still another object of the present invention is to provide improved adjusting devices especially adapted for butterfly valve sealing strips which may be readily applied and which may be manipulated while the valve is under pressure to insure tight closing of the valve as well as to release the valve from its seat within the housing when the strip binds or sticks thereto.

An additional object of my invention is to provide a renewable seal for preventing leakage past disk valves; and a highly efficient improved device comprising coacting means for effecting adjustments of the seal and for maintaining such adjustments.

Additional objects and advantages of the present invention will be apparent from the following detailed description.

A clear conception of one embodiment of the present improvement and of the mode of applying and utilizing devices constructed in accordance with the invention may be had by referring to the drawing accompanying and forming a part of this specification wherein like reference characters designate the same or similar parts in the several views.

Figures 1, 2, 3:
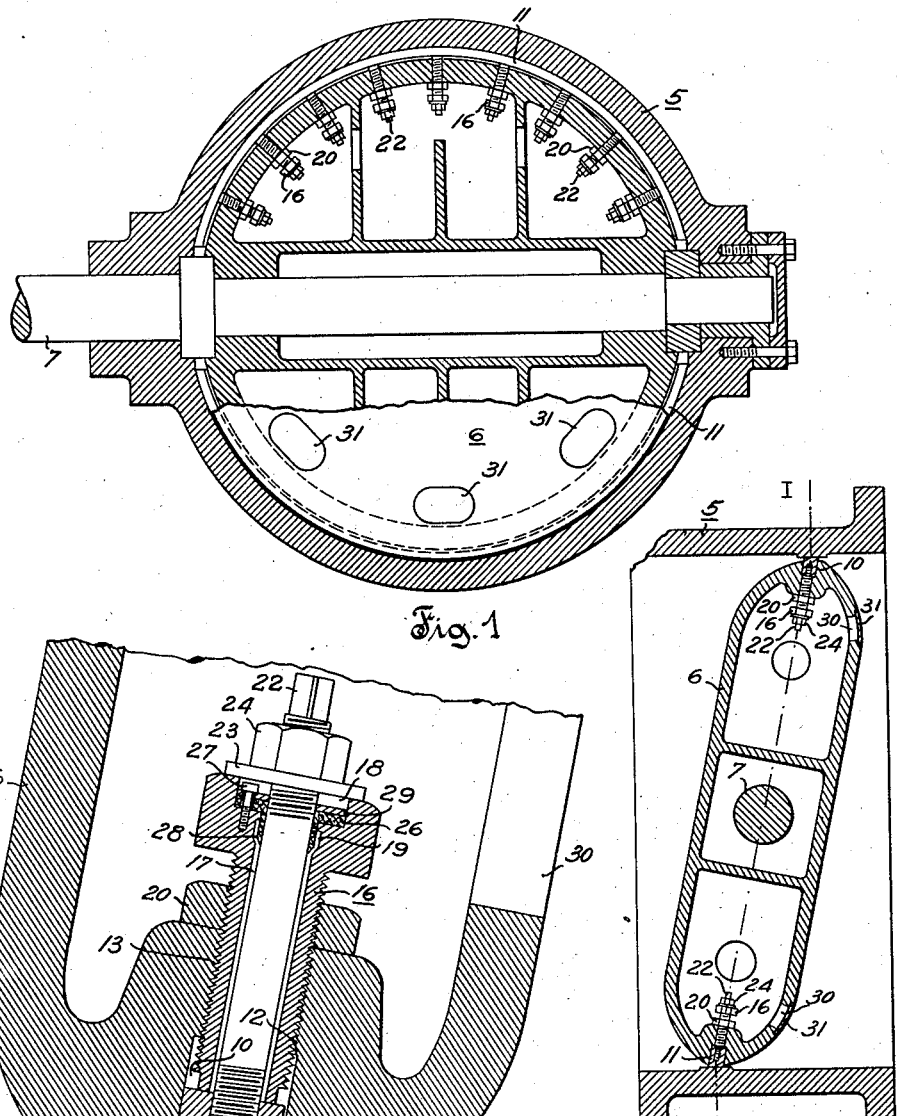
Fig. 1 is a transverse part sectional view through the valve disk and casing taken along the line I—I of Fig. 2.
Fig. 2 is a central vertical section through the valve disk and casing showing the valve in closed position.
Fig. 3 is an enlarged fragmentary sectional view showing the details of my improved adjusting device and sealing means as applied to butterfly valves.

Referring to the drawing, the valve structure therein illustrated comprises in general a valve casing or housing 5 of circular transverse cross-section, as shown in Fig. 1, and a valve disk or wicket 6 carried by a supporting shaft 7 journaled in the casing 5 for rotational movement of the disk 6 through actuating levers and operating means of conventional design, not shown. Supply and discharge pipes, likewise not shown, communicate with the opposite open ends of the casing 5, and the valve disk 6 may be swung to different positions to regulate the flow past the valve. The valve disk 6 is provided with a peripheral groove 10 for receiving a segmental sealing strip or ring 11 which may be of any desired number of segments but is shown, by way of illustration, as being formed of two like parts each extending from the valve shaft 7 on one side of the disk 6 to the shaft 7 on the opposite side of the disk 6.

The strip 11 fits loosely within the groove 10 to provide clearance for radial movement toward and away from the bottom wall 12 of the groove 10 as shown in detail in Fig. 3, and the disk 6 is provided with an annular series of radially extending screw threaded holes 13 in the wall thereof adjacent the groove portion while the segmental strip 11 is provided with a series of correspondingly spaced screw threaded openings 14 opening toward the holes 13 and formed concentric therewith.

Referring particularly to Fig. 3, an adjusting screw 16 having a central bore 17 extending therethrough and counterbored at 18 is threaded into each of the holes 13 and seats on the inner surface of the strip 11 to urge the strip radially away from the wall 12 of the groove 10 toward the casing 5. The bore 17 is preferably provided with an enlarged neck portion 19 adjacent the counterbore 18 for reasons hereinafter specified, and the screw 16 is provided with a lock nut 20 to lock the same in any desired position of adjustment.

A stud bolt 22, disposed concentrically of the adjusting screw 16 and freely movable within the bore 17, has one end threaded in the opening 14 of the strip 11 and carries a washer or cover plate 23 and a nut 24 at the opposite end. The washer 23 seats on the head of screw 16 and covers the counterbore 18 when the nut 24 is tightened to lock the segmental strip 11 tightly into seating engagement with the screw 16.

To prevent leakage past the clearances provided for the strip 11 and through the bore 17 to the interior of the disk 6, a packing 26 within the counterbore 18 and surrounding the stud bolt 22 is provided. The packing 26 may be retained in position by means of a metal ring 29 and screws 27 or other suitable means, and the packing 26 is preferably formed, as shown in Fig. 3, with an annular depending collar or flange 28 engaging the stud bolt 22 and extending downwardly from the counterbore 18 into the bore 17 and the enlarged portion 19 thereof.

In assembling the improved valve structure, the segmental sealing strip 11 is first placed in position within the groove 10 with the opening 14 in alinement with the holes 13. The screws 16, lock nuts 20, stud bolts 22, packing 26, washer 23 and nut 24 may then be loosely assembled in position in the most convenient order and in an obvious manner, and the valve disk may then be swung to closed position as shown in the drawing. The adjusting screws are then tightened to urge the strip 11 into sealing engagement with its seat in the housing, and the lock nuts 20 are brought into locking position against the inner wall of the disk. The packings may then be checked and tightened, and the sealing strip retained tightly against the adjusting screws through the stud bolt by tightening the nut 24. Access to the interior of the disk for the foregoing adjustments may obviously be obtained through openings 30 in the downstream face of the disk which may be covered with plates 31 if desired, and the assembly and original adjustments must, of course, be effected only after the fluid has been drained from the casing and adjoining supply and discharge pipes. After all parts have been assembled and adjusted as described, the valve is ready for use under pressure, and further adjustments may be made from the downstream side with the valve in closed position and without relieving the upstream pressure.

It is apparent that, as wear occurs from constant opening and closing of the valve disk, the sealing strip may be reseated against the casing by merely closing the valve, backing off the lock nuts 20 and stud nuts 24, tightening the adjusting screws 16, and finally tightening the lock nuts and stud nuts. To move the sealing strip from seating engagement with the casing in the event of binding or sticking thereof, the lock nuts 20 and adjusting screws 16 are both backed off after the nuts 24 have been loosened, and the segmental strip 11 may then be pulled inwardly from its seat by tightening the nut 24 after lock nuts 20 have been adjusted to effect locking of the screws 16 in backed-off position.

It should be noted that the sealing strip may be readily adjusted in a simple manner either radially inwardly, away from seating engagement with the casing, or radially outwardly, toward seating engagement therewith, and without necessity for removal of any parts which might result in loss of such parts as well as valuable time in effecting the adjustment. The adjusting device, moreover, is compact and unitary and may be located entirely within the valve disk or wicket, with no working parts interfering with the surface of the disk. Adjustments may be made while the valve is closed and under extremely high pressure without dangerous leakage through the clearances to the interior of the disk because of the improved construction and design which permits the packings to be so located and formed as to prevent leakage even though the stud nuts and washers might be removed. By providing the packings with collars 28 extending into the enlarged portions 19 of the central bores of the adjusting screws, the pressure through the clearances does not bear entirely in an axial direction on the packing but instead is somewhat radial and aids in retaining the packing collar tightly against the stud bolt.

While the sealing strip has been shown as formed of two segments and with nine of my improved adjusting devices applied to each segment, the number of segments and adjusting units for each segment may obviously be varied as desired without departing from the scope of my invention; and while the improved device has been shown and described as being applied to a particular type of butterfly valve, it is apparent to persons skilled in the art that it may be utilized with any valve requiring similar adjustments.

It should therefore be understood that it is not desired to limit the present invention to the exact details of construction and operation and the particular application herein shown and described, for various modifications within the scope of the claims may occur to persons skilled in the art.

It is claimed and desired to secure by Letters Patent:

1. A valve structure comprising a casing, a valve disk cooperable with said casing for regulating flow therethrough and having a peripheral groove, a sealing strip disposed within said groove and cooperable with the interior of said casing, adjustable means formed for seating engagement with said strip, and means coacting directly with an end of said adjustable means and with said strip for seating and locking said strip against said adjustable means.

2. A valve structure comprising, a casing, a valve disk rotatably mounted within said casing and having an outer peripheral groove, a sealing strip disposed within said groove and cooperable with the interior of said casing, adjustable means formed for seating engagement with said strip for positioning said strip, and means carried by said strip for seating and locking said strip against said adjustable means, said seating and locking means having a washer directly engageable with said adjustable means.

3. A valve structure comprising, a casing, a valve disk rotatably mounted within said casing and having an outer peripheral groove, a sealing strip disposed within said groove and cooperable with the interior of said casing, adjustable means formed for seating engagement with said strip, and means coacting directly with said adjustable means and with said strip for seating and locking said strip against said adjustable means, said adjustable means and said seating and locking means both extending into the interior of said disk.

4. A valve structure comprising, a casing, a valve disk rotatably mounted within said casing and having an outer peripheral groove, a sealing strip disposed within said groove and cooperable with the interior of said casing, adjustable means formed for seating engagement with said strip, and means disposed concentrically of said adjustable means and coacting with said strip for seating and locking said strip against said adjustable means, said concentrically disposed means having a washer directly engageable with said adjustable means and said adjustable means and said concentrically disposed means both extending into the interior of said disk.

5. A valve structure comprising, a casing, a valve disk rotatably mounted within said casing and having an outer peripheral groove, a sealing strip disposed within said groove and cooperable with the interior of said casing, adjustable means formed for seating engagement with said strip, means disposed concentrically of said adjustable means and coacting with said strip for seating and locking said strip against said adjustable means, said concentrically disposed means having a washer directly engageable with said adjustable means, and a packing between said adjustable means and said concentrically disposed means to prevent leakage therebetween.

6. A valve structure comprising, a casing, a valve disk rotatably mounted within said casing and having an outer peripheral groove, a sealing strip disposed within said groove and cooperable with the interior of said casing, an adjusting screw having a central bore and formed for coaction with said strip for adjusting the position thereof, and means axially movable within said bore secured at one end to said strip and formed for direct coaction at the opposite end with said adjusting screw for locking said strip in adjusted position.

7. A valve structure comprising, a casing, a valve disk rotatably mounted within said casing and having an outer peripheral groove, a sealing strip disposed within said groove and cooperable with the interior of said casing, an adjusting screw having a central bore and counterbore and formed for seating engagement with said strip, means axially movable within said bore secured at one end to said strip and formed for direct coaction at the opposite end with said adjusting screw for seating and locking said strip against said adjusting screw, and a packing disposed within said counterbore and surrounding said axially movable means.

8. A valve structure comprising, a casing, a valve disk rotatably mounted within said casing and having an outer peripheral groove, a sealing strip disposed within said groove and cooperable with the interior of said casing, an adjusting screw having a central bore and counterbore and formed for seating engagement with said strip, means axially movable within said bore secured at one end to said strip and formed for direct coaction at the opposite end with said adjusting screw for seating and locking said strip against said adjusting screw, and a packing disposed within said counterbore and surrounding said axially movable means, said packing having an annular collar extending axially of said adjusting screw into said bore.

9. A valve structure comprising, a casing, a valve disk rotatably mounted within said casing and having an outer peripheral groove, a sealing strip disposed within said groove and cooperable with the interior of said casing, an adjusting screw having a central bore and counterbore and formed for seating engagement with said strip, said bore having an enlarged portion adjacent said counterbore, means axially movable within said bore secured at one end to said strip and formed for direct coaction at the opposite end with said adjusting screw for seating and locking said strip against said adjusting screw, and a packing secured to said adjusting screw within said counterbore and surrounding said axially movable means, said packing having an annular collar extending axially of said adjusting screw into the enlarged portion of said bore.

10. A valve structure comprising, a casing, a valve disk rotatably mounted within said casing and having an outer peripheral groove, a sealing strip disposed within said groove and cooperable with the interior of said casing, an adjusting screw formed for seating engagement with said strip, a stud bolt disposed concentrically of said adjusting screw and having one end thereof threadably engaging said strip, and means threadably engaging the opposite end of said stud bolt and including an annular washer directly engageable with said adjusting screw for seating and locking said strip against said adjusting screw.

11. A valve structure comprising, a casing, a valve disk rotatably mounted within said casing and having an outer peripheral groove, a sealing strip disposed within said groove and cooperable with the interior of said casing, an adjusting screw formed for seating engagement with said strip, a stud bolt disposed concentrically of said adjusting screw and having one end thereof threadably engaging said strip, and a nut threadably engaging the opposite end of said stud bolt and coacting with said adjusting screw for seating and locking said strip against said adjusting screw, said adjusting screw and said nut both extending into the interior of said disk.

12. A valve structure comprising, a casing, a valve disk rotatably mounted within said casing and having an outer peripheral groove, a sealing strip disposed within said groove and cooperable with the interior of said casing, an adjusting screw having a central bore and counterbore and formed for coaction with said strip for adjusting the position thereof, a stud bolt extending through the bore of said adjusting screw, a packing disposed within the counterbore of said adjusting screw and surrounding said stud bolt, and means threadably engaging said stud bolt at one end thereof and formed for coaction with said adjusting screw above the counterbore, said stud bolt being secured at the opposite end thereof to said strip.

13. A valve structure comprising, a casing, a valve disk rotatably mounted within said casing and having an outer peripheral groove, a sealing strip disposed within said groove and cooperable with the interior of said casing, an adjusting screw having a central bore and counterbore and formed for coaction with said strip for adjusting the position thereof, means for locking said adjusting screw in any position of adjustment, a stud bolt extending through the bore of said adjusting screw, a packing disposed within the counterbore of said adjusting screw and surrounding said stud bolt, a cover plate for the counterbore seating on said adjusting screw and extending around said stud bolt, and means threadably engaging said stud bolt at one end thereof and formed for coaction with said adjusting screw through said cover plate, said stud bolt being secured at the opposite end thereof to said strip.

EMIL GROSS.

REFERENCES CITED

The following references are of record in the file of this patent:

UNITED STATES PATENTS

| Number | Name | Date |
|---|---|---|
| 1,546,594 | McAulay | July 21, 1925 |
| 1,740,041 | Schmidt | Dec. 17, 1929 |
| 2,083,154 | Kinzie | June 8, 1937 |
| 1,937,246 | Reedy | Nov. 28, 1938 |